US012110737B2

(12) United States Patent
Hung et al.

(10) Patent No.: US 12,110,737 B2
(45) Date of Patent: Oct. 8, 2024

(54) INTERNALLY DISMANTLED ANTI-TYPHOON SOUNDPROOF HORIZONTAL SLIDING WINDOW

(71) Applicants: Wen-Yi Hung, Taipei (TW); Hao-Ting Hung, Taipei (TW)

(72) Inventors: Wen-Yi Hung, Taipei (TW); Hao-Ting Hung, Taipei (TW)

( * ) Notice: Subject to any disclaimer, the term of this patent is extended or adjusted under 35 U.S.C. 154(b) by 0 days.

(21) Appl. No.: 17/983,533

(22) Filed: Nov. 9, 2022

(65) Prior Publication Data

US 2024/0151098 A1 May 9, 2024

(51) Int. Cl.

| | |
|---|---|
| ***E06B 5/12*** | (2006.01) |
| ***E05B 65/08*** | (2006.01) |
| ***E05C 1/04*** | (2006.01) |
| ***E05C 3/04*** | (2006.01) |

(52) U.S. Cl.

CPC ............ *E06B 5/12* (2013.01); *E05B 65/0811* (2013.01); *E05B 65/0864* (2013.01); *E05C 1/04* (2013.01); *E05C 3/045* (2013.01)

(58) Field of Classification Search

CPC ........ E06B 5/12; E06B 3/4627; E06B 3/4618; E06B 3/4609; E05C 1/04; E05C 3/045; E05B 65/0811; E05B 65/0864

See application file for complete search history.

(56) References Cited

U.S. PATENT DOCUMENTS

| | | | | |
|---|---|---|---|---|
| 3,538,642 A * | 11/1970 | Fredricksen | E06B 3/4609 | 49/213 |
| 4,222,201 A * | 9/1980 | Yanessa | E05D 15/58 | 49/174 |
| 4,685,586 A * | 8/1987 | Lewis, Jr. | E06B 5/12 | 220/314 |
| 4,703,960 A * | 11/1987 | Lense | E05B 47/0012 | 292/201 |
| 4,807,914 A * | 2/1989 | Fleming | E06B 3/325 | 292/DIG. 31 |
| 4,841,673 A * | 6/1989 | Tjomsland | E05B 65/1033 | 49/141 |
| 5,140,769 A * | 8/1992 | Hickson | E06B 3/50 | 49/186 |

(Continued)

*Primary Examiner* — Justin B Rephann

(74) *Attorney, Agent, or Firm* — BACON&THOMAS, PLLC

(57) ABSTRACT

An internally dismantled anti-typhoon soundproof horizontal sliding window, which is fastened to an outer frame body and is provided with at least one outer sliding window and an inner sliding window; it is characterized in that: the outer side of the outer frame body is provided with at least one outer fixing column, an elastically movable top plate is provided on the inside and outside of the outer fixed column; when the two windows are closed, a central control lock can be used to drive the top plate to move through the inner columns of the outer and inner windows inwardly, the top plate squeezes the two inner column clamps tightly; the outer column of the outer frame body is provided with a hook, which can be used for the outer sliding window and the outer column of the inner sliding window; a snap cover that seals the grooves of the outer frame; thus, the window structure can be tightly closed in an all-round way, so as to meet the requirements of windproof, rainproof and sound insulation of the strong typhoon level.

15 Claims, 14 Drawing Sheets

(56) References Cited

U.S. PATENT DOCUMENTS

| | | | | |
|---|---|---|---|---|
| 6,216,401 | B1 * | 4/2001 | Emek | E06B 5/12<br>52/204.5 |
| 2005/0051279 | A1 * | 3/2005 | Hung | E05C 19/001<br>160/98 |

* cited by examiner

INTERNALLY DISMANTLED ANTI-TYPHOON SOUNDPROOF HORIZONTAL SLIDING WINDOW

BACKGROUND OF THE INVENTION

Field of the Invention

The present invention relates to a kind of sound-insulating horizontal sash window which, especially when the inner sliding window and the outer sliding window are in a closed state, is at least provided with three-point fastening and gap sealing, and can counteract the strong typhoon grade wind force and achieve comprehensive prevention of wind seepage, water seepage, and sound seepage, to achieve a very safe, internally detachable anti-typhoon soundproof horizontal sliding window.

Description of the Related Art

With the rapid development of technology and industrial and commercial enterprises, in addition to the shortage of available land, in order to provide more living space for the population, high-rise buildings have become the normal condition in the industrial and commercial society. When high-rise buildings spring up like mushrooms after a rain, the wind and rain protection problems of high-building doors and windows also emerge one by one. As the building gets taller and taller, the wind pressure on the windows increases relatively with each floor. In the island climate of the country, every June to November is the typhoon season. The performance, water tightness and safety are tested by strong wind and rain from time to time.

Taiwan had been had three strong typhoons (winds of magnitude 17) in a row in a year. In addition to causing environmental disasters, strong typhoons can cause water leakage in homes, and may cause the doors and windows to damage and fall, bring about safety problems. As mentioned above, as high-rise buildings get higher and higher, the wind pressure to bear is also increasing, and customers have stricter requirements on aluminum windows, to make architects or designers and other related design and construction companies for high-rise buildings. It is better to choose fixed windows and use central air conditioners, and the existing push-out windows or horizontal-sliding windows can only be guaranteed to 16-level wind (moderate typhoon). Furthermore, in Taiwan, air conditioning is required for no more than half a year in a year. If natural ventilation or landscape is abandoned for this reason, it will not only destroy the quality of living, but also seriously affect the health of the occupants.

The general window structure has three types: fixed type, extrapolation type and horizontal pull type. Although the fixed window can achieve complete isolation, it does not meet the needs of people to enjoy natural wind or experience the outside scenery. The extrapolation structure is easy to be rusted and damaged due to the wind and rain for many years, so the horizontal-pull window is still the mainstream of the public demand and high-rise buildings.

The frame of the traditional horizontal-pull window is mainly composed of an extruded aluminum frame and embedded glass. In order to improve the waterproof and sound insulation properties of windows, manufacturers have invested considerable manpower in research and improvement. For example, the published Taiwan U.M. No. M600332 entitled "Airtight Window Structure with Multi-layer Chamber", mainly discloses that a platform is arranged inside the outer frame, and a vertical plate is arranged on the indoor side of the platform. There is a step groove lower than the platform surface on the outside of the platform, and a blocking rib is formed on the top edge of the step groove, and then three air-tight rubber strips are respectively fitted into the fitting grooves of the outer frame and the window sash, so that when the window sash is closed, the air-tight rubber strip is closely attached to the corresponding position between the outer frame and the window sash, and the gap between the outer frame and the window sash is divided to form a multi-layer chamber, thereby improving the overall sound insulation and air-tightness of the aluminum doors and windows. Another published Taiwan U.M. No. M510969 entitled "wind-stop and airtight device for windows" patent case, mainly discloses that the main seat is installed in the upper horizontal frame of the outer frame, one side of the main seat is fixed in the upper horizontal frame, and the other side of the main seat is fixed in the upper horizontal frame. Then there is a main blocking part, the main blocking part is extended with a plurality of fins, and a side blocking part is extended on any peripheral side of the main seat part; and the side blocking part is arranged on the top end of the side blocking part, and the side blocking part includes a substrate and a plurality of stoppers, the substrate is assembled with the side stopper, and each stopper is hollow and arranged on the top surface of the substrate to abut against the side stopper The corresponding side is cut with a cutout, and each stopper located between the stoppers at both ends is further cut with openings in the same direction as the cutout; noise, wind and rain intrude into the room from between the outer frame and the inner frame, and between the inner and outer sash windows.

However, the above-mentioned related technologies can only improve the problem of easy leakage of some aluminum extruded window frames. When it is installed on a high floor, once faced with the high pressure impact of strong wind and rain, the problems of water seepage and noise still cannot be solved.

In view of the above-mentioned deficiencies in the conventional aluminum door and window bodies, the inventors are tirelessly researching and improving, and after many tests and improvements, finally there is the present invention.

SUMMARY OF THE INVENTION

Therefore, an objective of the present invention is to provide a kind of internal dismantling type anti-typhoon sound insulation horizontal sliding window, which has a complete set of safety performance, including that the window sash structure can be disassembled in an all-round way, and the exterior is provided with a fixed column, which can prevent the sash window from falling and strengthen the overall structure.

According to the present invention, the internal detachable anti-typhoon soundproof horizontal sliding window is completely internal detachable type, without the problems that traditional screen windows will damage the landscape and fall, and at the same time can achieve ultra-high water tightness, air tightness, anti-typhoon, anti-noise and can also prevent the leakage of cold air and the entry of hot air, and meet the requirements of energy saving and carbon reduction, which is another object of the present invention.

According to the present invention, the detachable anti-typhoon soundproof horizontal sliding window has safety and structural enhancement, can be large-scale lighting and ventilation, and can provide architects and designers with one more design safety option, which is another aspect of the present invention.

According to the internal dismantling type anti-typhoon soundproof horizontal sliding window of the present invention, the upper and lower rails inside the outer frame body are further provided with magnetically attractable snap covers, and the grooves can be closed by the snap covers. The upper through-holes are filled in, so that the inner and outer sliding windows can be more compact when locked relative to each other, which is also another object of the present invention.

As for the internal dismantling type anti-typhoon soundproof horizontal sliding window of the present invention, its detailed structure and specific embodiments can be fully understood with reference to the following description according to the accompanying drawings.

DETAILED DESCRIPTION OF PREFERRED EMBODIMENT

Figure 1:
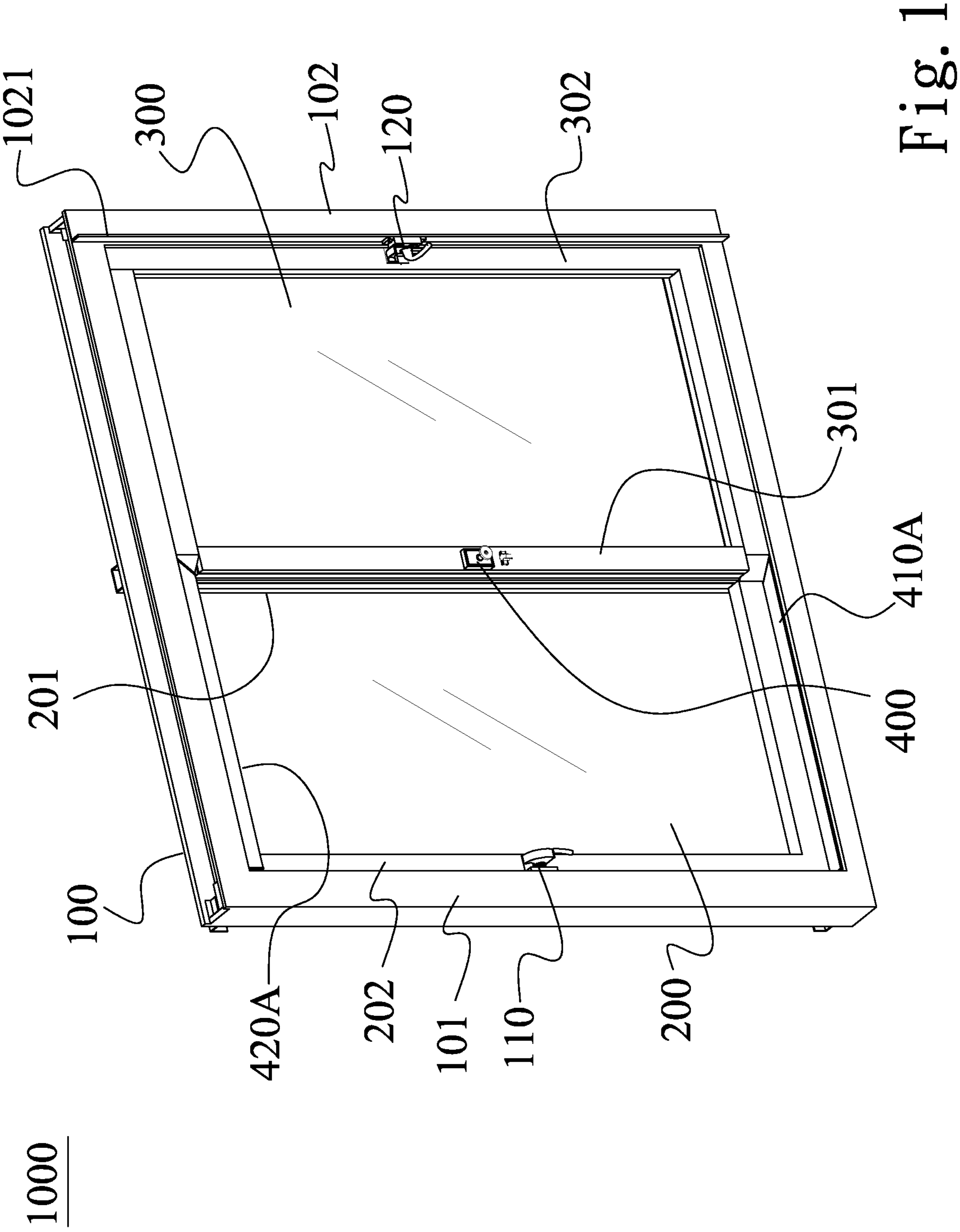
FIG. 1 is a schematic diagram of the three-dimensional assembly of the internal dismantling anti-typhoon soundproof horizontal sliding window of the present invention.

As shown in FIG. 1, the double internally dismantled anti-typhoon soundproof horizontal sliding window of the present invention is hereby set to two fan-type horizontal sliding windows of an internal sliding window and an outer sliding window inside an outer frame body as an example, with the description of the drawings.

As shown in the figure, the horizontal sliding window 1000 is attached to the interior of an outer frame body 100 and is provided with an outer sliding window 200 and an inner sliding window 300. The outer sliding window 200 and the inner sliding window 300 can move laterally on the track of the outer frame body 100. The outer frame body 100, the outer sliding window 200 and the inner sliding window 300 are each composed of two upright columns and upper and lower horizontal members to form a rectangular frame body. For the convenience of the following description, the outer sliding window 200 and the inner sliding window 300 are defined as inner columns 201 and 301 near the center of the outer frame, and outer columns 202 and 302 near the two sides of the outer frame.

As shown in the figure, the outer frame body 100 is provided with snap hook devices 110 and 120 on the left column 101 and the right column 102 respectively. The snap hook device 110 is arranged on the inner side of the left column 101. The snap hook device 120 is disposed on the board surface of the additional board 1021 of the right upright column 102. A central control latch 400 is also provided on the inner column 301 of the inner sliding window 300;

As shown in the figure, the upper and lower horizontal materials of the outer frame body 100 are respectively provided with a movable snap cover plate 410A, 420A on the upper and lower grooves on the other side of the inner sliding window 300, The snap cover plates 410 and 420 can be taken out or put in freely by the user. When the snap cover plates 410A and 420A cover and fasten inside the horizontal material groove of the outer frame body 100, the outer columns 202 and 302 of the outer sliding window 200 and the inner sliding window 300 are respectively held by the snap hook devices 110 and 120. When the pressing button is pressed tightly, and the inner columns 201 and 301 of the outer sliding window 200 and the inner sliding window 300 are locked and fastened by the central control lock 400 at the same time, the window can be fully tightened and airtight, so as to cope with a strong typhoon or anti-typhoon, sound insulation and anti-leakage effect.

Figure 3:
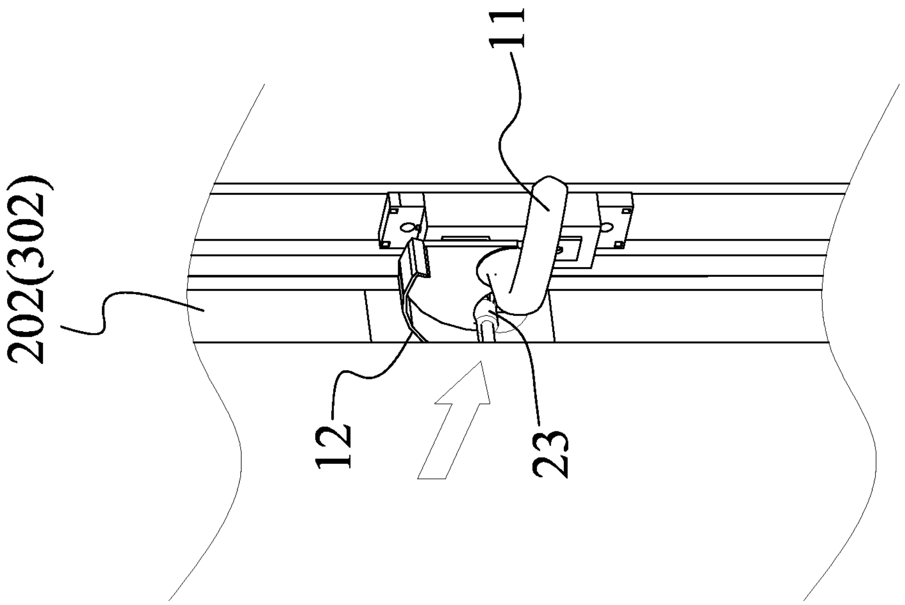
FIG. 3 is a schematic diagram of the action of the hook device of the internally dismantled anti-typhoon soundproof horizontal sliding window of the present invention.
Figure 2:
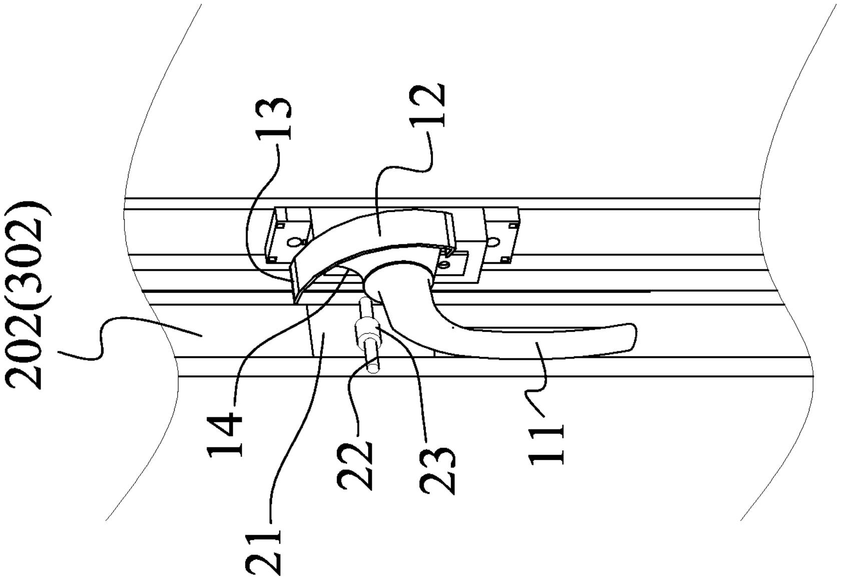
FIG. 2 is an enlarged schematic view of the hook device of the internally dismantled anti-typhoon soundproof horizontal sliding window of the present invention.

Please refer to FIG. 2 and FIG. 3, the snap hook devices 110 and 120 are provided with a handle 11, the handle 11 is rotatable, and one end of the handle 11 is a crimping portion

12, and the end of the crimping portion 12 is equivalent to The conical tail end 13 of the olecranon-shaped hook forms an arc-shaped buckle edge 14 at the lower end. On the outer columns 202 and 302 of the outer sliding window 200 and the inner sliding window 300, a groove 21 is provided at a position opposite to the respective snap hook devices 110 and 120, and a cross bar 22 is arranged outside the groove 21. The cross bar 22 is fixed on the outer columns 202 and 302 of the outer sliding window 200 and the inner sliding window 300 by welding or other means. The shaft passes through a roller 23, which is preferably a Peilin™ brand roller.

Thereby, when the outer sliding window 200 and the inner sliding window 300 are respectively pulled to both sides until the windows are in a closed state, the handles 11 of the snap hook devices 110 and 120 are rotated to make the sharp cones of the buckle portions 12 The rear end 13 presses the runner 23 on the cross bar 22; when the handles 11 and 12 continue to rotate, the curved lip 14 at the lower end of the clasp 12 can continue to press the runner 23, forcing the outer sliding window 200 to the inner sash. The window of the inner sliding window 300 moves inward with the continuous rotation of the handle 11; when the outer sliding window 200 and the inner sliding window 300 move inward, they can be tightly positioned between the upper and lower horizontal materials of the outer frame 100. The snap cover plates 410A and 420A in the grooves can thus achieve the pressing of the side ends of the outer sliding window 200 and the inner sliding window 300.

Figure 4:
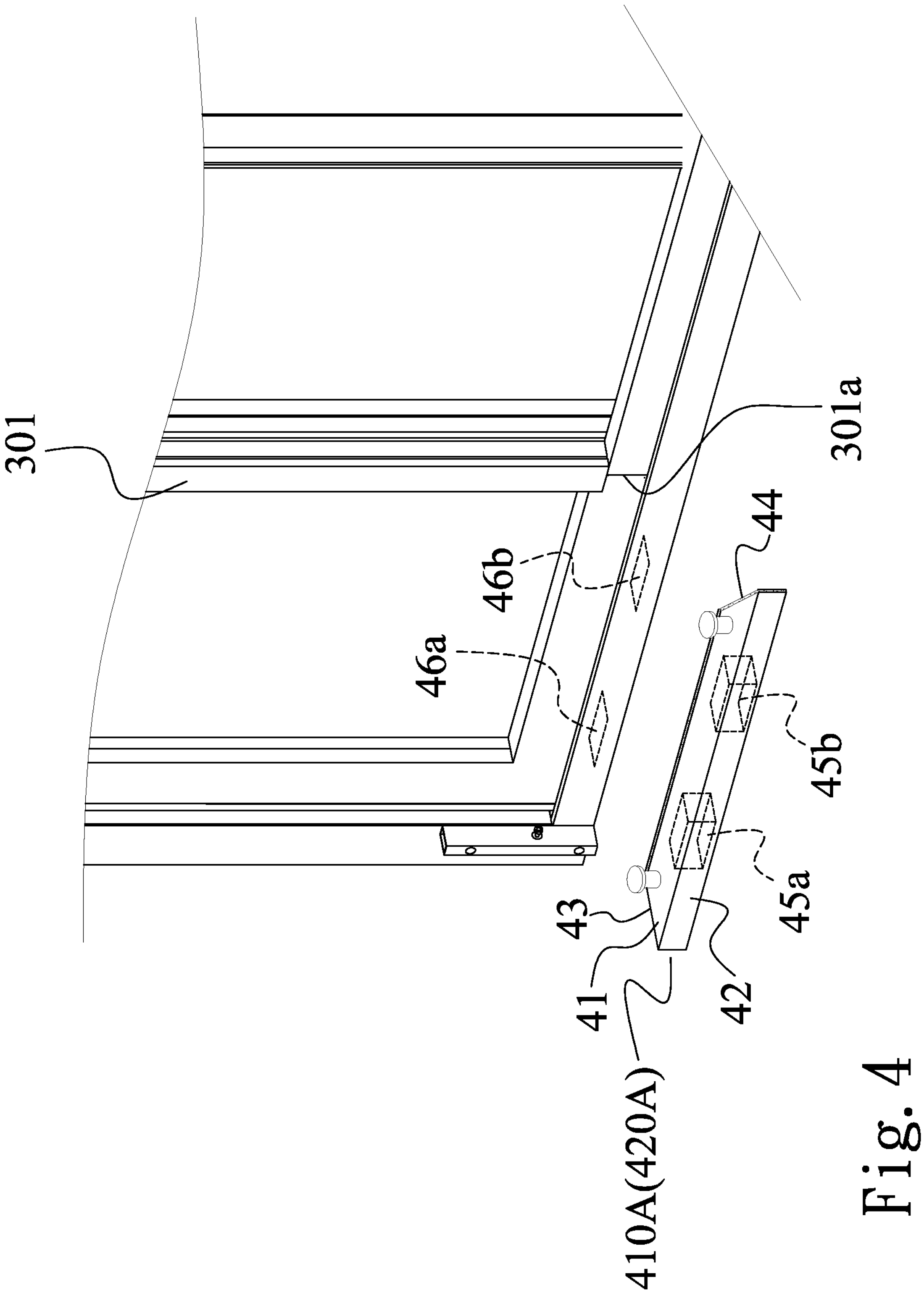
FIG. 4 is an enlarged schematic view of the snap cover of the internally dismantled anti-typhoon soundproof horizontal sliding window of the present invention.

Please refer to FIG. 4, the snap cover plates 410A and 420A are L-shaped plates, which are composed of a horizontal plate 41 and a vertical plate 42. The horizontal plate 41 is close to one end of the outer frame. It is a straight edge 43, and one end of the inner column 301 close to the inner sliding window 300 is an oblique straight edge 44, and the edge of the horizontal plate 41 is provided with an anti-seepage rubber strip. The upper and lower ends of the inner column 301 of the inner sliding window 300 are opposite to the oblique straight edge 44 of the snap cover plates 410A and 420A. When the buckle cover plates 410A and 420A are fastened in the groove, they can press against the inner column 301 of the inner sliding window 300 and the outer sliding window 200 at the same time.

As shown in the figure, the snap cover plates 410A and 420A are provided with two magnetic attractors 45*a* and 45*b*. The bottom ends of the magnetic attractors 45*a* and 45*b* are magnets. Metal pieces 46*a*, 46*b* are preset at positions opposite to the magnetic attractors 45*a*, 45*b* on the bottom surface of the groove of the lower cross material. In this way, the snap cover plates 410A and 420A can be quickly snapped into the grooves of the upper and lower horizontal materials of the outer frame body 100 through the adsorption of the magnetic attractors 45*a* and 45*b* and the metal sheets 46*a* and 46*b*, or take out freely by the user.

Figure 5:
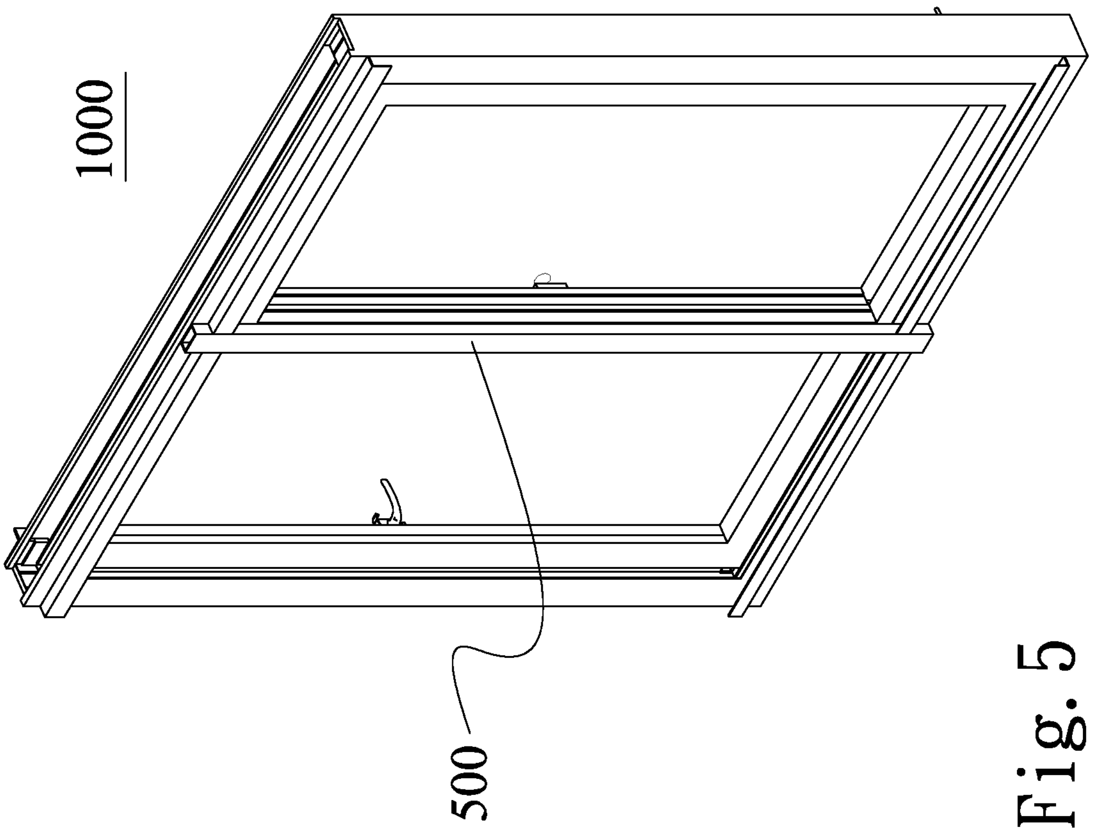
FIG. 5 is a three-dimensional schematic diagram of another angle of the internally dismantled anti-typhoon soundproof horizontal sliding window of the present invention.
Figure 6:
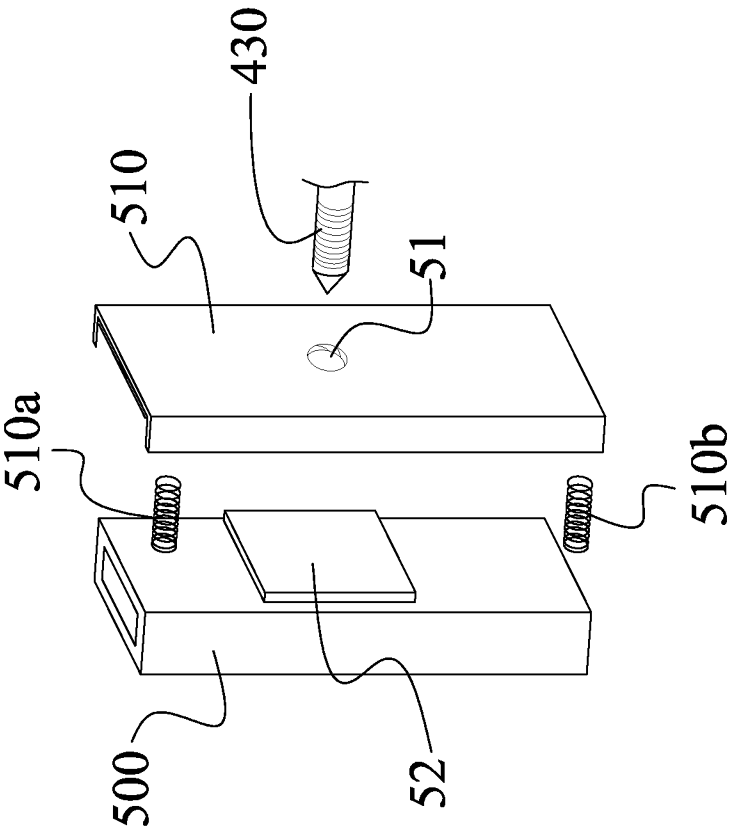
FIG. 6 is an enlarged schematic view of the outer fixing column and the top plate of the internally dismantled anti-typhoon soundproof horizontal sliding window of the present invention.

Please refer to FIGS. 5 and 6 at the same time, the outer side of the outer frame body 100 is provided with an outer fixing column 500 at a position close to the center. The external fixation post 500 is made of steel frame material, and a top plate 510 is provided on the inner periphery of the top plate 510. The top plate 510 is a U-shaped plate, which is connected to the side of the external fixation post 500 by several springs 510*a* and 510*b*, so that it can moderately elastic move. A screw hole 51 is formed on the body of the top plate 510. A backing plate 52 is provided on the cylindrical surface of the outer fixing column 500 corresponding to the position of the screw hole 51 of the top plate 510.

Figure 7:
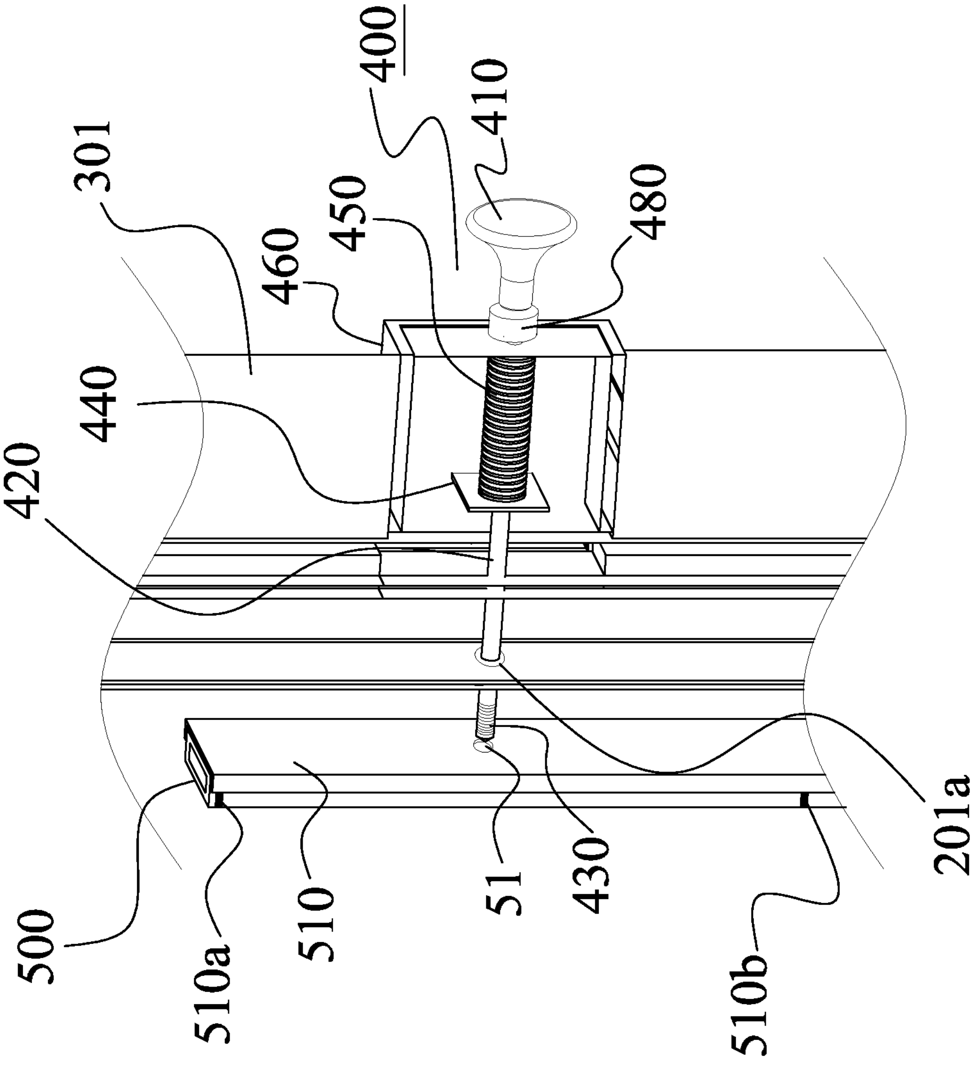
FIG. 7 is a partial cross-sectional schematic diagram of the central control lock of the internally dismantled anti-typhoon soundproof horizontal sliding window of the present invention.
Figure 8A:
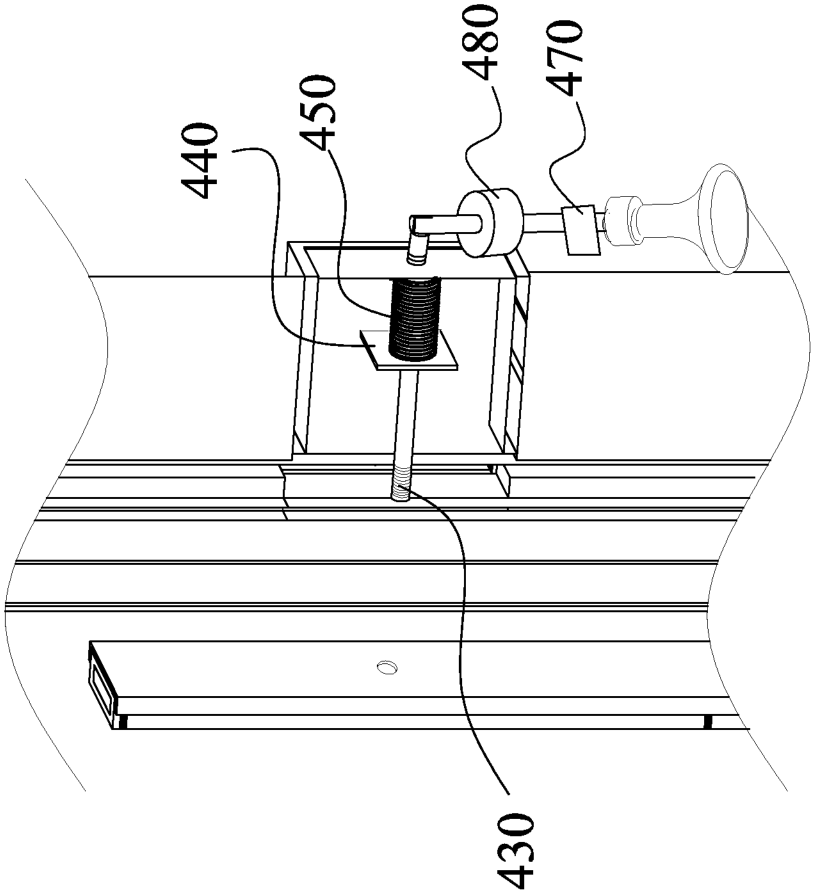
FIG. 8A is a schematic partial cross-sectional action diagram of the central control latch of the internally dismantled anti-typhoon soundproof horizontal sliding window of the present invention.
Figure 8B:
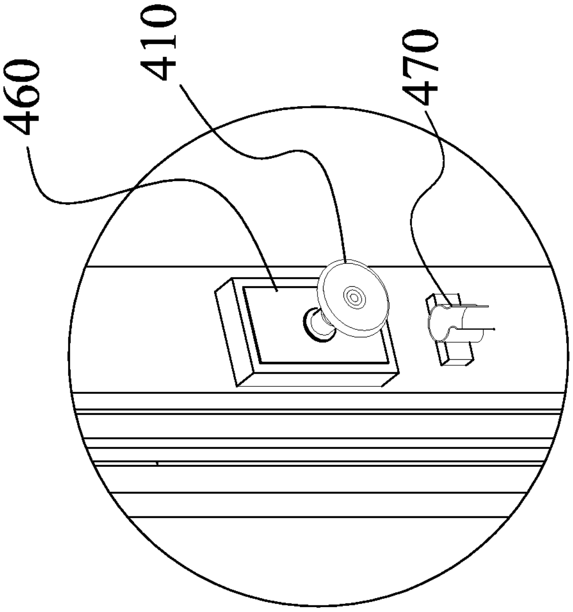
FIG. 8B is an external schematic view of the central control lock of the internally dismantled anti-typhoon soundproof horizontal sliding window of the present invention.

Please refer to FIGS. 7, 8A and 8B at the same time, the central control latch 400 disposed on the inner column of the inner sliding window 300 is provided with an operating portion 410, and the front end of the operating portion 410 is connected to a bendable pull rod 420, the front end of the pull rod 420 is formed with external threads 430, the middle position of the pull rod 420 passes through an abutting plate 440, one end of the abutting plate 440 is provided with a spring 450, the abutting plate 440 and the spring 450 are covered by an outer casing 460, and the outer casing 460 is installed inside the middle section of the inner column 301 of the inner sliding window 300.

Thereby, when the outer sliding window 200 and the inner sliding window 300 are respectively pulled to the two sides to make the window in a closed state, the inner columns 201, 301 and the top plate 510 are relatively superimposed, and the operating portion 410 control the pull rod 420 to be horizontal and straight, and then make the front end of the pull rod 420 penetrate through the through hole 201*a* on the inner column 201 of the outer sliding window 200, and the external screw thread 430 on the rod body is screwed with the screw hole 51 of the top plate 510, and Its front end abuts against the backing plate 520 on the outer fixing column 500. When the operating portion 410 control the pull rod 420 to rotate, the top plate 510 as a whole can move inwardly due to the screw hole 51 of the external screw 430. When the top plate 510 moves inwardly, the inner column 201 and the inner column 301 of the inner sliding window 300 is relatively tight due to being pushed by the top plate 510 at the same time.

When the window surface is to be opened, the operating portion 410 is used to control the pull rod 420 to rotate in the opposite direction, and the top plate 510 can then move outward in the direction of the fixing column 500 due to the reversal action of the external screw 430 due to the screw hole 51. When the screw hole 51 is completely separated from the external thread 430, it is restored to its original position by the elastic force of the springs 510*a* and 510*b*, so that the lateral movement of the outer sliding window 200 on the track of the outer frame is not affected.

After the top plate 510 springs back to its original position, the operating portion 410 controls the pull rod 420 to pull back and bends the pull rod 420, so that the abutting plate 440 can be driven to compress the spring 450, so that the spring 450 is compressed. Afterwards, if you want to close the window again, as long as the operating part 410 controls the pull rod 420 to be horizontal, the pull rod 420 can be driven by the restoring elastic force of the spring 450, and the front end of the pull rod 420 can quickly penetrate through the through hole 201*a* on the inner column of the outer sliding window 200, and screw the screw holes 51 of the top plate 510, when the pull rod 420 is controlled to rotate, the top plate 510 can be easily moved inward, so that the inner columns 201, 301 of the outer sliding window 200 and the inner sliding window 300 are quickly and relatively tight.

Moreover, as shown in the figure, in order to facilitate the use and fold of the central control lock 400, the inner column 301 of the inner sliding window 300 is further provided with a card seat 470, and the card seat 470 can provide the central control lock When the lock 400 is not in use and the pull rod 420 is bent, the pull rod 420 is fastened and fixed, and the operation part 410 can be flatly attached to the inner column 301 of the inner sliding window 300 so as not to affect the overall appearance of the window.

As shown in the figure, the central control latch 400 is at the front end of the operation part 410, on the pull rod 420 and is provided with a bearing wheel 480, the bearing wheel 480 can not only provide when the operation part 410 drives the pull rod 420 to rotate It is not affected, and it is provided that when the top plate 510 moves inward, the inner column 301 of the inward sliding window 300 can be pressed against the inner column 201 of the outer sliding window 200 relative to the top plate 510.

In the present invention, in order to achieve the omni-directional anti-typhoon sound insulation horizontal window, in order to meet the requirements of the strong typhoon (level 17 wind), in addition to improving the structural sealing and filling of the window, There are further details of multiple enhancements, which are described in conjunction with the diagrams.

Figure 9:
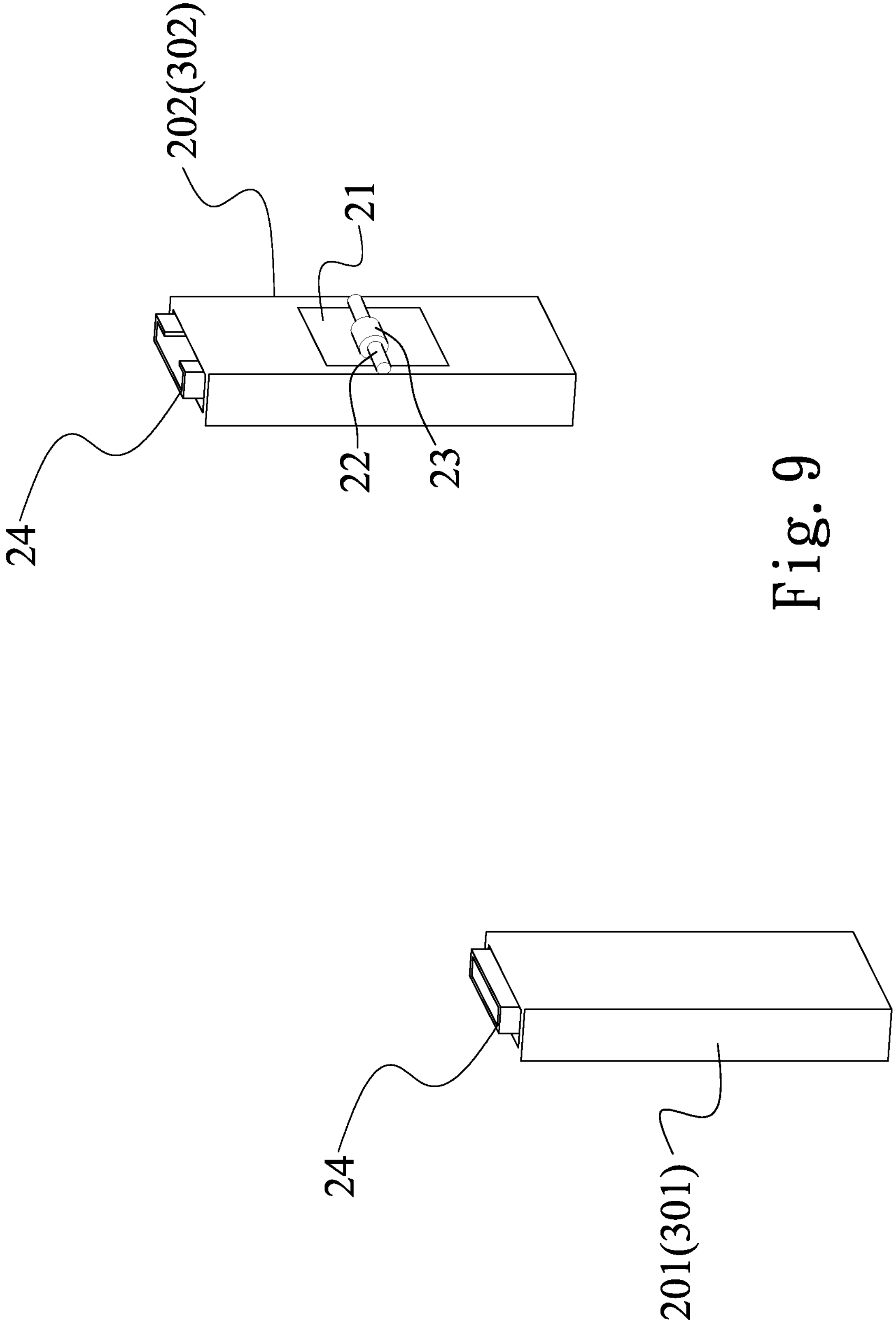
FIG. 9 is a three-dimensional schematic diagram of the internally dismantled anti-typhoon soundproof horizontal sliding window provided with steel reinforcement inside the column of the present invention.

Please refer to FIG. 9, the inner columns 201, 301, and the outer columns 202, 302 of the outer sliding window 200 and the inner sliding window 300 are respectively provided with a steel frame 24, and the cross bar Both ends of the 22 are fixed to the steel frame 42, so that it has sufficient tensile strength to be pulled in response to the strong pressing of the snap hook devices 110 and 120. By piercing the steel frames 24 inside the inner columns 201, 301 and the outer columns 202, 302, in addition to preventing the columns from being deformed due to stress, the columns can be relatively clamped or attached to the outer frame body, so it can be achieve a truly airtight effect. In addition, when the outer column of the outer sliding window 200 is hooked by the snap hook device 110 and the inner column is pressed by the top plate 510 to move inward as a whole, in order not to deviate from the original track, the pulley at the lower end of the window can be adjusted to use tiltable pulleys (not shown).

Figure 10:
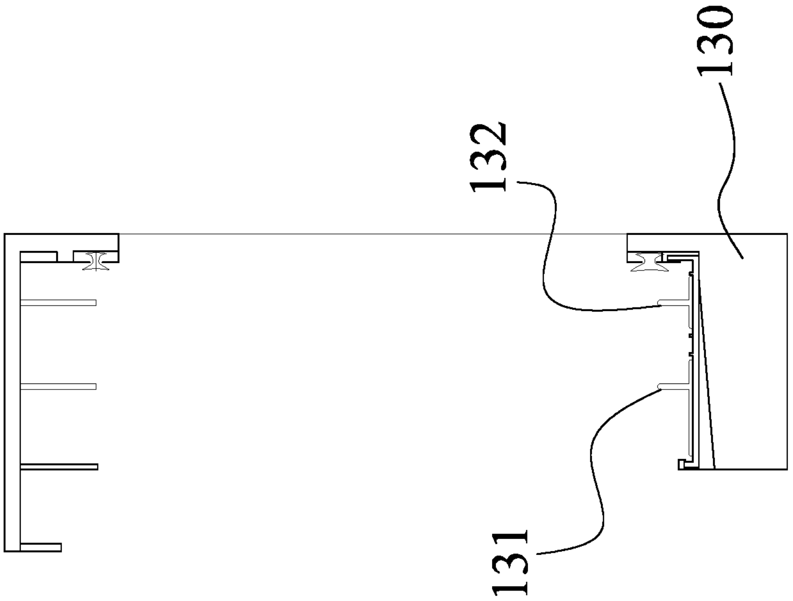
FIG. 10 is a side view of the upper and lower horizontal materials of the outer frame of the internally dismantled anti-typhoon soundproof horizontal sliding window of the present invention.

In addition, as shown in FIG. 10, on the lower horizontal material 130 of the outer frame body 100, there are only guide plates 131, 132 and two guide plates 131, 132 for providing sliding of the outer sliding window 200 and the inner sliding window 300. No other partitions are set between them, so that when the outer sliding window 200 is forced to move inward, it can avoid being blocked by other partitions and affect the airtight effect, so that the inner sliding window 300 and the card can be fully tightened. Full air tightness requirements for the buckle cover plates 410A and 420A.

Figure 11:
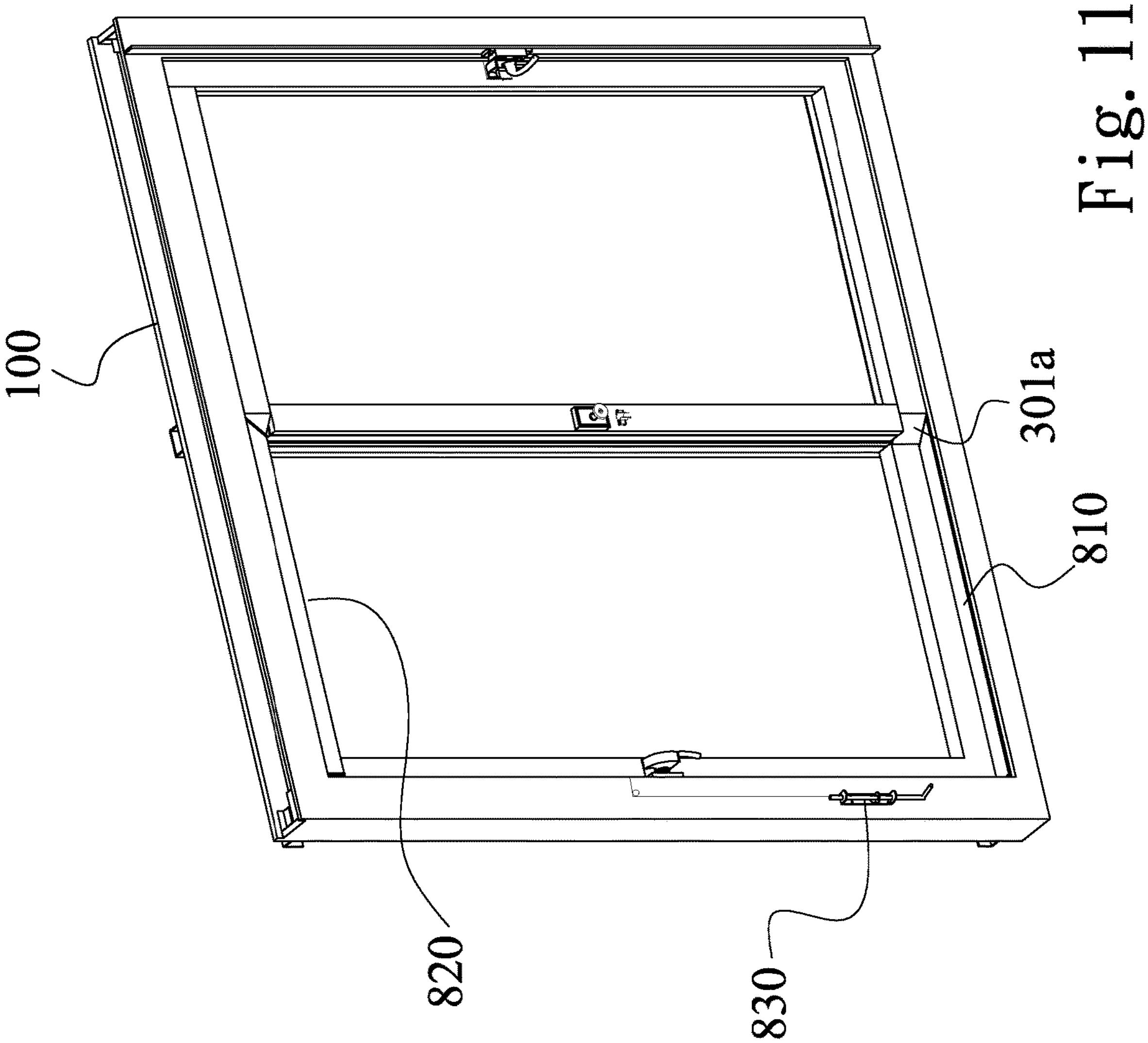
FIG. 11 is a three-dimensional schematic diagram of another embodiment of the internally dismantled anti-typhoon soundproof horizontal sliding window of the present invention.
Figure 12:
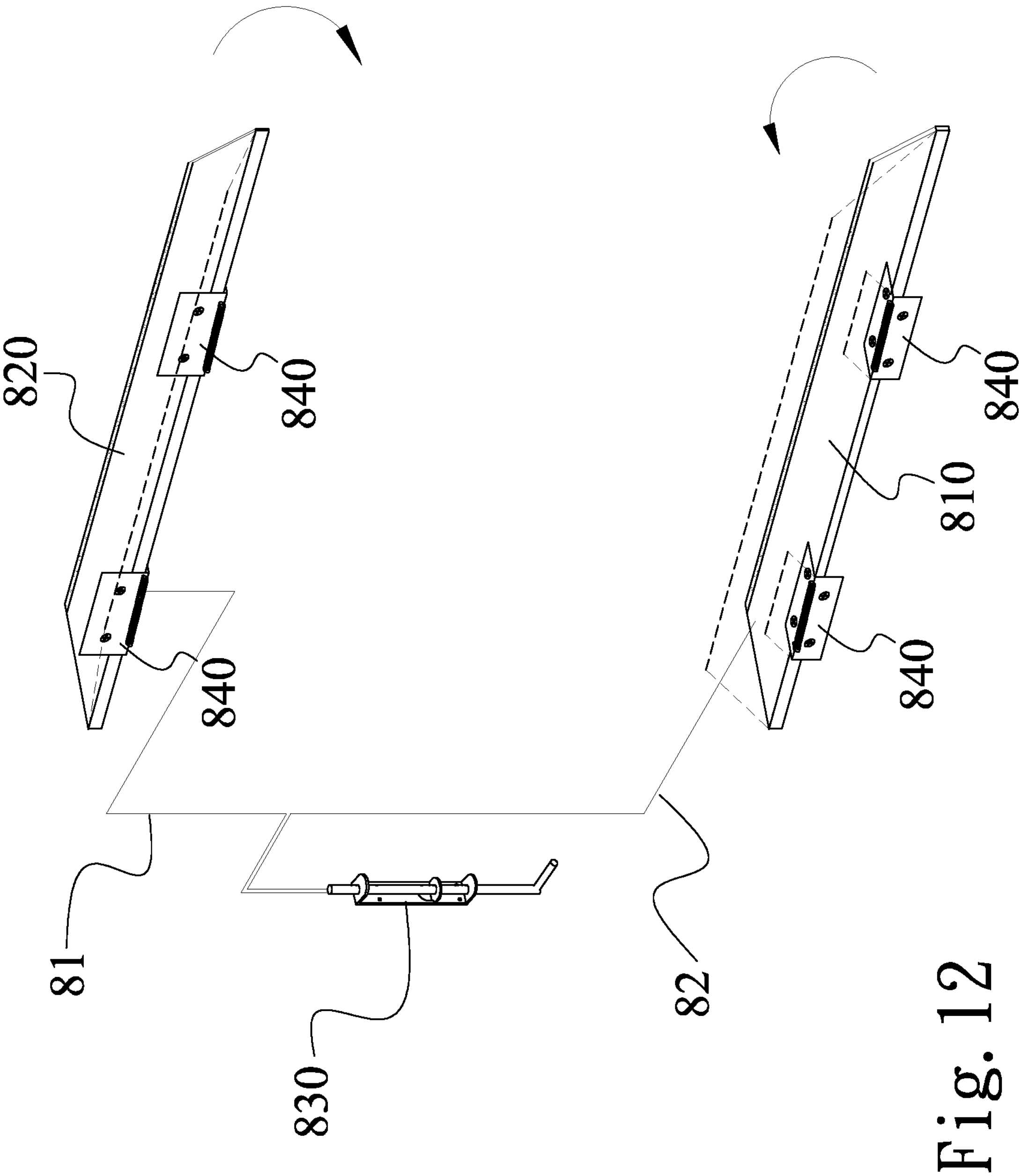
FIG. 12 is a three-dimensional schematic view of the flip cover plate and the push-puller of the internally dismantled anti-typhoon soundproof horizontal sliding window of the present invention.

Please refer to FIGS. 11 and 12, the snap cover can also be changed to an upper and lower linkage type. As shown in the figure, on the upper horizontal material and the lower horizontal material of the outer frame body 100, a flip cover plate 810, 820 is respectively provided. On the material, the flip cover plates 810 and 820 have the same function as the aforementioned snap-fit cover plates, which can fill the grooves in the horizontal material. A pull rope 81 and 82 are respectively connected to one end of the flip cover plates 810 and 820. The pull ropes 81 and 82 are jointly controlled by a push-pull device 830 after passing through several switching points. The push-pull device 830 can be installed outside. on the outer column of the frame body 100. Thereby, the two flip-up panels 810 and 820 can be controlled to be lifted or covered on the horizontal material of the outer frame body 100 at the same time through the push-pull device 830.

Figure 13:
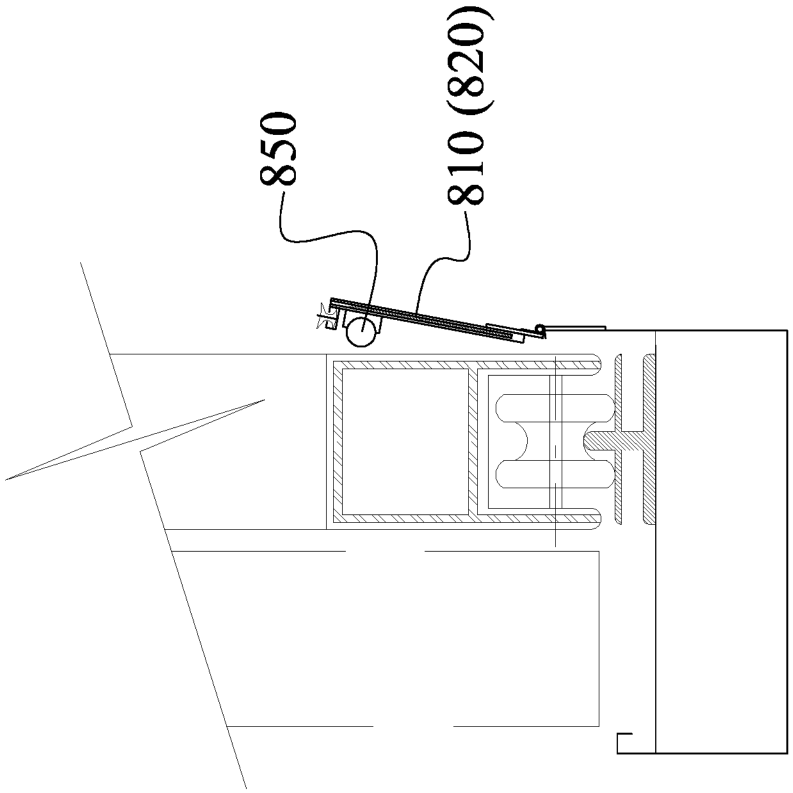
FIG. 13 is a schematic diagram of the action of the cover plate of the internally dismantled anti-typhoon soundproof horizontal sliding window of the present invention.

Please refer to FIG. 13, the bottom surface of the cover plates 810, 820 is provided with several balls 850. When the cover plates 810, 820 are partially lifted by the control of the push-puller 830, the inner window is lifted. 300 horizontal pulling, that is, the inclined panel 301*a* of the inner column 301 of the inner sliding window 300 can be pressed against the ball 850 in a state of almost frictionless force. Move the cover plates 810 and 820 to be smoothly pushed and completely lifted.

Figure 14:
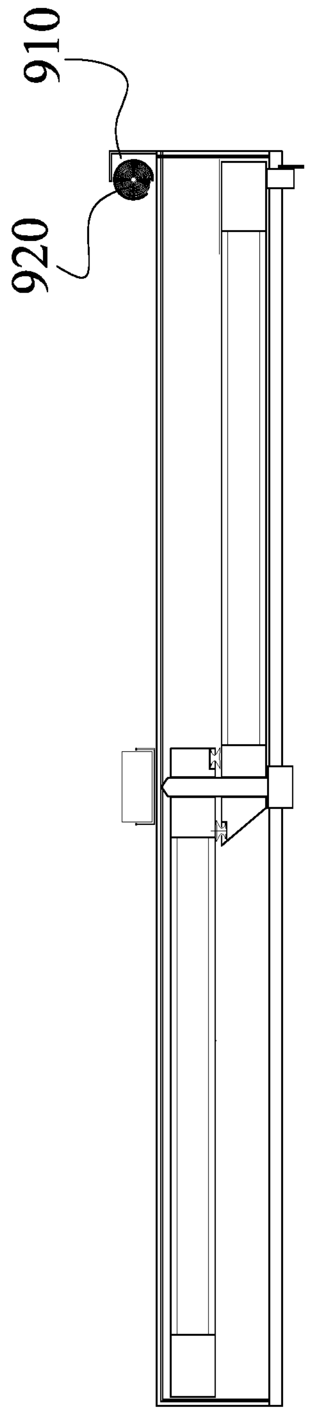
FIG. 14 is a top view of another embodiment of the internally dismantled anti-typhoon soundproof horizontal sliding window of the present invention.

Also, as shown in FIG. 14, a screen groove 910 can be provided on the outside of the outer frame to install a see-through screen window 920, and one end of the see-through screen window 920 can be connected to the outer sliding window 200, so that the landscape outside the window is not affected.

Figure 15:
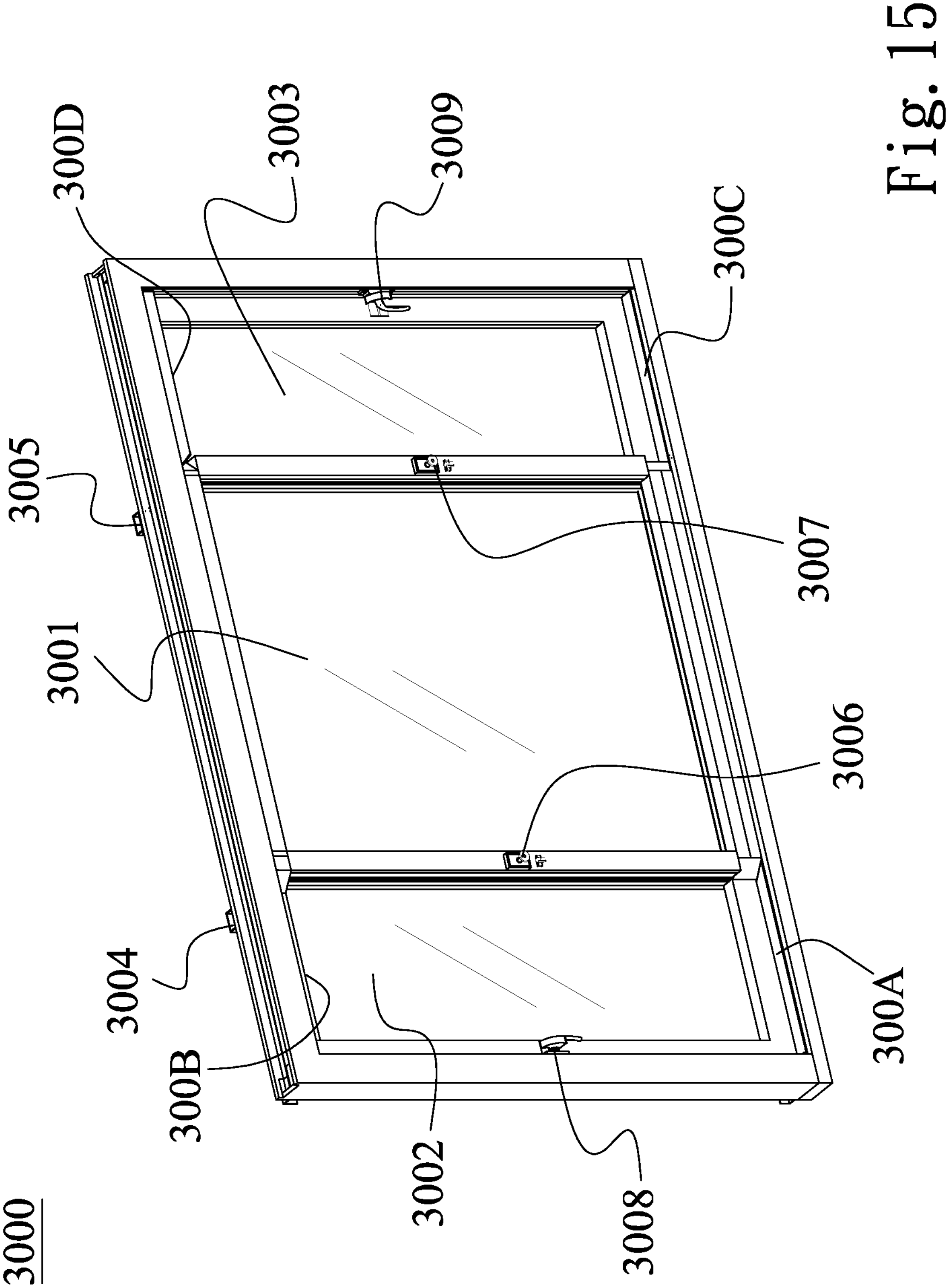
FIG. 15 is a three-dimensional schematic diagram of another embodiment of the internally dismantled anti-typhoon soundproof horizontal sliding window according to the present invention.

Please refer to FIG. 15 again, internally dismantled anti-typhoon soundproof horizontal sliding window of the present invention can provide comprehensive and tight fixing of the outer frame, the outer sliding window and the inner sliding window. The three-sided landscape window 3000 of the sliding window can still achieve comprehensive air tightness and compression resistance. The structure of the three-sided landscape window 3000 is roughly the same as that of the two-sach window. The main difference is that it is in an inner sliding window. An outer sliding window 3002, 3003 is arranged on the two outer sides of the 3001; on the outer side of the outer frame, an outer fixing column 3004, 3005 is respectively arranged at the overlapping position of the column of the inner sliding window and the outer sliding window; a central control lock 3006, 3007 is provided; both hooks 3008, 3009 are provided on the inner side of the column of the outer frame; Buckle cover 3000A, 3000B, 3000C, 3000D; this can provide high-rise residents, not only can fully enjoy the high-rise landscape view, but also can not be afraid of strong wind and rain of strong typhoon level.

In addition, in the present invention, the internally dismantled anti-typhoon soundproof horizontal sliding window is provided with a sealing strip at the contact interface of the inner sliding window, the outer sliding window and the outer frame body, because the window structure is provided with a sealing strip, the airtightness of the contact interface is a general technique, and the present invention is not particularly shown in the drawings, and is hereby described.

From the above, it can be seen that the internally dismantled anti-typhoon soundproof horizontal sliding window of the present invention indeed provides a more effective airtight and soundproof effect, and completely improves the lack of the conventional window frame, which has not been found in any publications, and is not in the market. There are no similar products in the above, so there should be no doubts about its novelty. In addition, the unique features and functions of the present invention are far from comparable to conventional ones, so it is indeed more progressive than conventional ones.

Absolutely the above-mentioned ones are only the preferred embodiments of the present invention, and should not limit the scope of implementation of the present invention, that is, simple equivalent changes and modifications made according to the scope of the patent application of the present invention and the contents of the description, shall still fall within the scope of the patent of the present invention.

What is claimed is:

1. An internally dismantled anti-typhoon soundproof horizontal sliding window comprising at least one outer sliding window and an inner sliding window in an interior of an outer frame body, the outer frame body guiding the at least one outer sliding window and the inner sliding window; the inner sliding window is composed of left and right columns and upper and lower horizontal members; the outer and inner sliding windows are composed of inner columns, outer columns and upper and lower horizontal members;

wherein a snap hook device is respectfully installed on each of two vertically extending sides of the outer frame body to hold respective vertically extending sides of the at least one outer sliding window and the inner sliding window and enable the respective vertically extending sides of the outer and inner sliding windows to be tightened against the vertically extending sides of the outer frame body and control a relative tightness between an inner column of the at least one outer sliding window and an inner column of the inner sliding window;

wherein the internally dismantled anti-typhoon soundproof horizontal sliding window includes a central control lock that causes a top plate arranged outside an outer casing to move inward, so as to push on a top of and clamp the at least one outer sliding window, thereby ensuring the sealing of the internally dismantled anti-typhoon soundproof horizontal sliding window, and wherein an outer side of the outer frame body is provided with an outer fixing post, an inner side of the outer fixing post is provided with the top plate, and the top plate includes a plurality of springs connected with the outer fixing post, so that the top plate is caused by the central control lock to move inward against an elastic force of the springs, and to return to an original position of the top plate by the elastic force of the springs upon release of the top plate by the central control lock.

2. The internally dismantled anti-typhoon soundproof horizontal sliding window as claimed in claim 1, wherein a screw hole is arranged on a board body of the top plate, and the central control lock is includes an operating part that causes a pull rod to pass through a through hole in the inner column of the outer sliding window, and wherein a front end of the pull rod is externally threaded to be screwed into the screw hole and cause the top plate to move the vertically extending sides of the outer and inner sliding windows in an inward direction.

3. The internally dismantled anti-typhoon soundproof horizontal sliding window as claimed in claim 2, wherein the pull rod passes through an abutting plate, one end of the abutting plate is provided with a spring, the abutting plate and the spring are covered by the outer casing, and the outer casing is installed inside the inner column of the inner sliding window.

4. The internally dismantled anti-typhoon soundproof horizontal sliding window as claimed in claim 3, wherein the pull rod is bendable.

5. The internally dismantled anti-typhoon soundproof horizontal sliding window as claimed in claim 4, wherein a cylindrical surface of the outer fixing column is provided with a backing plate corresponding to the position of the screw hole of the top plate.

6. The internally dismantled anti-typhoon soundproof horizontal sliding window as claimed in claim 5, wherein each said snap hook device is provided with a handle, the handle is rotatable, one end of the handle is a crimping portion, the end is tapered to form an arc-shaped buckle; the outer sliding window and the outer column of the inner sliding window are respectively provided with a groove at a position opposite to the buckle, and an outside of the groove constitutes a horizontal bar against which the hook device is pressed.

7. The internally dismantled anti-typhoon soundproof horizontal sliding window as claimed in claim 6, wherein upper and lower horizontal portions of the outer casing are respectively provided with a buckle cover plate on another side of the inner sliding window, the inner side of the said buckle plate is provided with a magnetic attractor for magnetically attracting a metal sheet on a bottom of a horizontal portion of the outer frame body, so that a snap cover plate can be taken out or installed at will.

8. The internally dismantled anti-typhoon soundproof horizontal sliding window as claimed in claim 7, wherein inner parts of the inner columns of the outer and inner sliding windows pass through a steel frame; and end parts of said horizontal portion are fixed to the steel frame so as to prevent the inner parts from being pulled in response to the pressing of the snap hook device.

9. The internally dismantled anti-typhoon soundproof horizontal sliding window as claimed in claim 8, wherein a card seat is arranged on the inner column of the inner sliding window so that an overall appearance of the internally dismantled anti-typhoon soundproof horizontal sliding window is not affected when the pull rod is bent during use.

10. The internally dismantled anti-typhoon soundproof horizontal sliding window as claimed in claim 9, wherein the central control lock is locked at a front end of the operating part, a bearing wheel is provided on the pull rod; and the bearing wheel squeezes the inner column of the outer sliding window and the inner column of the inner sliding window relative to the top plate to further tighten middle ends of the outer sliding window and the inner sliding window.

11. The internally dismantled anti-typhoon soundproof horizontal sliding window as claimed in claim 7, wherein the snap cover is a flip cover, the flip cover is connected to the horizontal portion of the outer frame, one end of each respective cover plate is connected with a pull rope, and the pull ropes on the cover plates are jointly controlled by a push-pull device.

12. The internally dismantled anti-typhoon soundproof horizontal sliding window as claimed in claim 11, wherein the flip cover has a beveled edge at one end close to the inner sliding window, and the inner column of the inner sliding window is also provided with opposite inclined panels, whereby when the inner sliding window is forced to move inwardly, the beveled edge of the flip cover can be installed by pressing at least one of the inclined panels, so that the snap cover or flip cover is firmly sealed.

13. The internally dismantled anti-typhoon soundproof horizontal sliding window as claimed in claim 12, wherein the flip cover is further provided with several balls on a bottom surface thereof such that when the flip cover is partially lifted, the inclined panel is pushed into the flip cover and contacts the balls in a state of near frictionless force, so that the flip cover can be smoothly and completely opened.

14. The internally dismantled anti-typhoon soundproof horizontal sliding window as claimed in claim 13, wherein the outer side of the outer frame body includes screen window grooves, so that one end of a see-through screen window is connected to the outer sliding without affecting a view of a landscape outside the internally dismantled anti-typhoon soundproof horizontal sliding window.

15. The internally dismantled anti-typhoon soundproof horizontal sliding window as claimed in claim 14, wherein the outer side of the outer frame is at an overlapping position of the column of the inner sliding window and the outer sliding window, each of the inner and outer sliding windows is provided with an outer fixing column; two side columns of the inner sliding window are each provided with a central control latch; the snap hook devices are arranged on the inner side of the column of the outer frame body; the outer frame body is located on the vertically extending sides of the inner sliding window; and a respective said snap cover plate is respectively arranged in upper and lower horizontal grooves of the vertically extending sides.

* * * * *